Patented Feb. 16, 1932

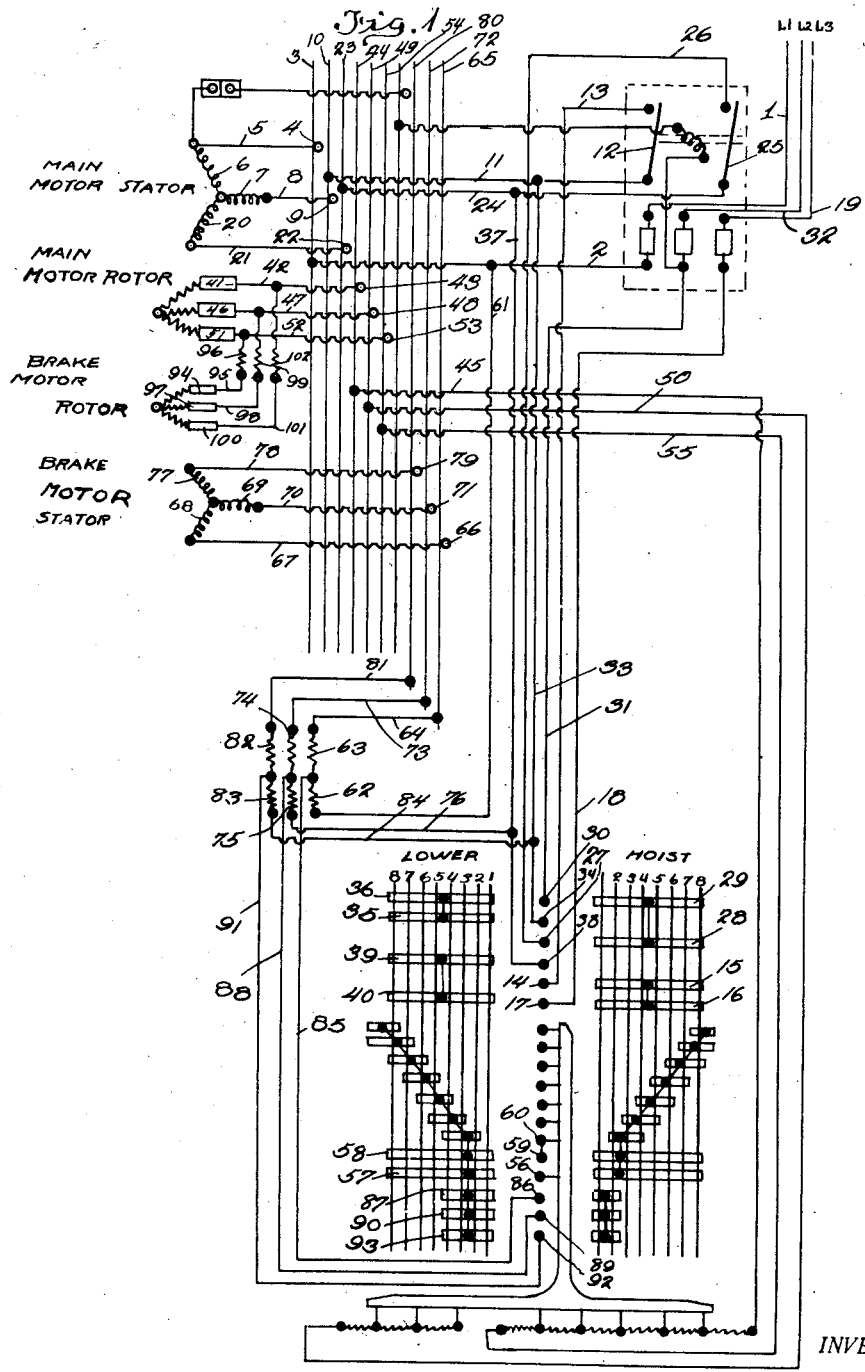

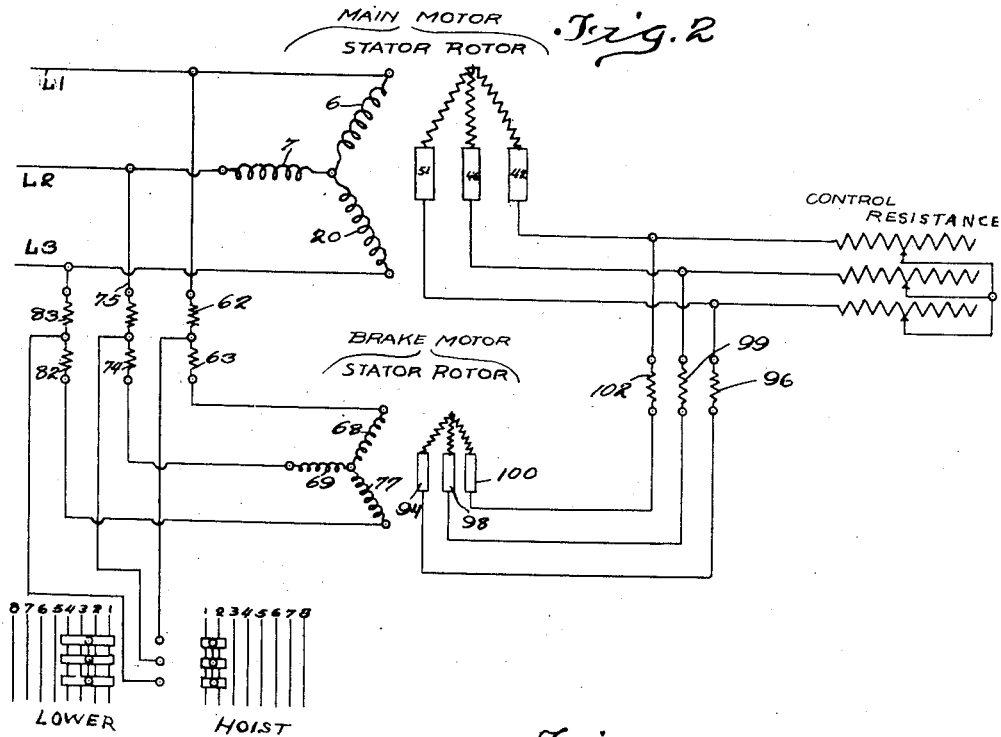

1,845,300

UNITED STATES PATENT OFFICE

GEORGE J. LEXA, OF MILWAUKEE, WISCONSIN, ASSIGNOR TO HARNISCHFEGER CORPORATION, OF MILWAUKEE, WISCONSIN, A CORPORATION OF WISCONSIN

SYSTEM FOR AND METHOD OF MOTOR CONTROL

Application filed August 5, 1929. Serial No. 383,754.

This invention relates to a method of and means for controlling the operation of an electric motor.

In many instances where electric motors are subject to frequent period of starting, stopping, and reversing, means other than or in addition to the usual resistance controller must be employed to obtain efficient and flexible operation of the motor. This is particularly true of large horse-power motors handling heavy and variable loads and in installations where it is desired to provide predetermined or definite motor speeds for each controller point, regardless of the load being handled by the motor. Such conditions are typical of those found in elevator and hoist installations.

In installations of this character it has been proposed to associate with the hoist motor a mechanical brake, provided with some form of automatic operating mechanism which will release the brake when the motor is energized and which will automatically apply the brake to stop the motor when the same is deenergized. In systems of this character the brakes are usually operated by electric solenoids, the latter being connected to the motor controller so as to be energized therefrom. While brake systems of this character possess desirable features for small H. P. installations, they likewise possess certain inherent characteristics which make them undesirable in large H. P. installations. The severe shocks and strains incident to the setting and the release of the brakes causes rapid wear on the brake rigging in general and the impact between the relatively moving parts of the solenoid and armature give rise to undesirable noises as well as cause mutilation of the armature or solenoid. In view of these objectionable features of motor control systems employing solenoid actuated brakes, attempts have been made to provide torque motors for actuating the brakes but so far as is known, these attempts have not thus far produced a reliable, efficient and commercially practical construction.

One object of the invention therefore is to provide a system of control for electric motors, particularly hoist or elevator motors, wherein is embodied a torque motor actuated brake simple in construction, quiet and reliable in operation, and thoroughly practical from a manufacturing as well as an operating standpoint.

Another object of the invention is to provide a control system of the character herein described wherein the brake motor is connected with the controller in a manner such that the movement of the controller to the first point forward or reverse serves to energize the brake motor at a reduced voltage so as to only partially release the brakes.

Another object of the invention is to provide a control system of the character described wherein the brake motor is connected with the main motor through the controller in a manner such that as the speed of the main motor increases from zero up to a predetermined value the brakes are applied with a gradually increasing force, while for greater speeds the brakes are released entirely.

A further object of the invention is to connect the brake motor and main motor through the controller in a manner such that for low speed of the main motor, either forward or reverse the torque of the brake motor is dependent upon the voltage across the main motor rotor while for high speeds, forward or reverse, the torque of the brake motor is dependent upon line voltage.

Another object of the invention is to interconnect the brake motor with the main motor through the controller in a manner to insure the brake motor being at least partially energized for all positions except the "off" position of the controller.

Another object of the invention is to electrically connect the main motor and brake motor to a single controller, and in a manner so that the brake motor may be selectively energized either through its rotor or through its stator.

These and other objects of the invention will become apparent from the following specification read in connection with the accompanying drawings, wherein a preferred embodiment of the invention has been illustrated. In the drawings, Fig. 1 is a diagram of connection, showing the connection between the main motor, the brake motor, and the controller;

Fig. 2 is a simplified diagram showing the important features of the system;

Fig. 3 is a diagram of one manner of connecting the brake and brake motor.

The present invention is capable of general application, but I have here chosen to describe it as used in connection with an electric hoist system including a 3 phase wound rotor induction motor as the main hoist motor and a similar motor as the brake operating motor. In Figure 1 of the drawings, I have diagrammatically shown the hoist and brake motors connected through a controller of conventional type and referring to this diagram it will be noted that the system is energized from supply lines L1, L2 and L3. The primary hoisting circuits are as follows:—

L1, wire 1, wire 2, bridge wire 3, collector shoe 4, wire 5, stator winding 6 of the main hoisting motor, stator winding 7, wire 8, collector shoe 9, bridge wire 10. wire 11, contactor 12, wire 13, controller finger 14, controller segment 15, controller segment 16, controller finger 17, wire 18. wire 19 to L3. The other circuit through the stator of the main hoisting motor may be traced from L1, wire 1, wire 2, bridge wire 3, collector shoe 4, wire 5, stator winding 6, stator winding 20, wire 21, collector shoe 22, bridge wire 23, wire 24, contactor 25, wire 26, controller finger 27, controller segment 28, controller segment 29, controller finger 30, wire 31, wire 32, to L2.

The primary lowering circuits may be traced as follows:—

L1 to wire 1, wire 2, bridge wire 3, collector shoe 4, wire 5, stator winding 6, stator winding 7, wire 8, collector shoe 9, bridge wire 10, wire 11, wire 33, controller finger 34, controller segment 35, controller segment 36, controller finger 30, wire 31, wire 32 to L2. The other lowering circuit through the main motor stator may be traced from L1 to wire 1, wire 2, bridge wire 3, collector shoe 4, wire 5, stator winding 6, stator winding 20, wire 21, collector shoe 22, bridge wire 23, wire 24, wire 37, controller finger 38, controller segment 39, controller segment 40, controller finger 17, wire 18, wire 19, to L3.

The above circuits all apply to the stator winding of the main motor. The rotor circuits through the main motor as follows:— rotor slip ring 41, wire 42, collector shoe 43, bridge wire 44, wire 45, to rotor resistances in controller; rotor slip ring 46, wire 47, collector shoe 48, bridge wire 49, wire 50, to rotor resistances in controller; and rotor slip ring 51, wire 52 collector shoe 53, bridge wire 54, wire 55 to rotor resistances in controller. The first point hoisting or lowering completes main rotor resistance circuit through resistance contact finger 56, controller segment 57, controller segment 58, finger 59, finger 60, and thence to the controller resistance. The remaining fingers and segments are used in the hoisting and lowering operations to successively short-circuit portions of the controller resistance in the usual manner, it being desirable in some instances to allow one section of resistance to remain permanently in circuit with each rotor winding.

The brake motor stator circuits hoisting may be traced as follows:—hoist; L1, wire 1, wire 2, wire 61, resistance 62, resistance 63, wire 64, bridge wire 65, collector shoe 66, wire 67, brake motor stator winding 68, stator winding 69, wire 70, collector shoe 71, bridge wire 72, wire 73, resistance 74, resistance 75, wire 76, wire 37, wire 24, contactor 25, wire 26, controller finger 27, controller segment 28, controller segment 29, controller finger 30, wire 31, wire 32, to L2. The other circuit through the brake stator winding is from L1 to wire 1, wire 2, wire 61, resistance 62, resistance 63, wire 64, bridge wire 65, collector shoe 66, wire 67, stator winding 68, stator winding 77, wire 78, collector shoe 79, bridge wire 80, wire 81 resistance 82, resistance 83, wire 84, wire 33, wire 11, contactor 12, wire 13, controller finger 14, controller segment 15, controller segment 16, controller finger 17, wire 18, wire 19, to L3.

Brake motor stator circuits lowering are as follows:—L1 to wire 1, wire 2, wire 61, resistance 62, resistance 63, wire 64, bridge wire 65, collector shoe 66, wire 67, stator winding 68, stator winding 69, wire 70, collector shoe 71, bridge wire 72, wire 73, resistance 74, resistance 75, wire 76, wire 37, controller finger 38, controller segment 39, controller segment 40, controller finger 17, wire 18, wire 19, to L3. The other lowering circuit through the brake motor stator is from L1 to wire 1, wire 2, wire 61, resistance 62, resistance 63, wire 64, bridge wire 65, collector shoe 66, wire 67, stator winding 68, stator winding 77, wire 78, collector shoe 79, bridge wire 80, wire 81, resistance 82, resistance 83, wire 84, wire 33, controller finger 34, controller segment 35, controller segment 36, controller finger 30, wire 31, wire 32, to L2.

The brake motor stator resistances 62, 75 and 83 are arranged to be connected in "star" for a purpose to be hereinafter explained. The star connection of these resistances on the lowering side may be traced as follows— resistance 62, wire 85, controller finger 86, controller segment 87; resistance 75 to wire 88, controller finger 89, controller segment 90; resistance 83; wire 91, controller finger 92, controller segment 93. Controller segments 87, 90, and 93 are electrically connected. A similar star connection is made on the hoisting side by corresponding contacts on the controller which are diagrammatically shown.

The brake motor rotor circuits may be traced as follows: slip ring 94, wire 95, resistance 96, wire 52 to slip ring 51; slip ring 97, wire 98, resistance 99, wire 47 to slip ring 46; slip ring 100, wire 101, resistance 102, wire 42, to slip ring 41.

From the above description it will be seen that the brake motor slip rings 94, 97 and 100 are connected to the main motor slip rings 51, 46 and 41, respectively through resistances 96, 99 and 102, respectively. This arrangement renders the brake motor rotor subject at all times to the voltage across the slip rings of the main motor rotor. This voltage, as is well known, is at a maximum when the main motor rotor is at a standstill and decreases to approximately zero when the main motor rotor has reached full speed.

The brake motor stator windings 68, 69 and 77 are connected through resistances 62, 75 and 83, to the main supply lines L1, L2 and L3 by which the main motor rotor is fed. However, it will be noted that on the first two controller points hoisting and on the first four controller points lowering the resistances 62, 75 and 83 are connected in star as hereinbefore described. This star connection virtually short-circuits the brake motor stator whereby the line voltage is automatically prevented from entering the brake motor stator in these positions of the controller. Under these conditions the brake motor stator becomes the secondary element of the brake motor while the rotor of said motor becomes the primary element energized directly from the slip rings of the main motor through resistances 96, 99 and 102. These resistances preferably have a value such that at maximum voltage in the main motor rotor, torque developed by the brake motor is substantially about 25% of the full torque of said motor. Thus only a partial release of the brakes is effected when the main motor is energized.

The manner in which the main motor elements and the brake motor elements are interconnected through the controller as just described is more clearly illustrated in the simplified wiring diagrammatically shown in Figure 2.

As hereinbefore stated, the invention contemplates the use of a mechanical brake which may be applied and released in accordance with the amount of torque developed by the brake motor. Any desired form of mechanical brake may be used and I have shown in Figure 3, one arrangement by which the desired results may be realized. The brake mechanism here shown forms no part of the present invention, the same being described in detail in my Patent No. 1,689,442, dated Oct. 30, 1928, and is shown here merely for the purpose of illustration.

Briefly, the brake here shown comprises a pair of brake shoe hangers 103 and 104, pivotally mounted to a suitable support 105 and arranged on opposite sides of a brake pulley 106 carried by the main motor shaft 107. The brake hangers are provided with brake shoes 108 which engage the brake pulley 106 and are maintained in braking contact therewith by means of a coil spring 109. The spring 109 is mounted upon a rod 110 which is pivotally connected at one end to the hanger 103. A block 111 is pivotally mounted in the upper end of the hanger 104 and the rod 110 has sliding connection therethrough. A bell crank 112 has one end pivotally mounted on the pin 113 by which the block 111 is supported at the upper end of the hanger 104. A second rod 114 is positioned below the rod 110 and is pivotally connected at one end to the hanger 103 and at the other end is pivotally connected to the knee of the bell crank 112. By this construction it is apparent that a downward pull on the long end of the bell crank 112 will cause the brake hangers 103 and 104 to be separated at their upper extremities and thus release the brake shoes 108 from operative engagement with the brake pulley 106. Normally, however, the spring 109 maintains the brake shoes 108 in braking engagement with the pulley 106.

Any suitable mechanical connection may be employed between the shaft of the brake motor and the arm of the bell crank 112 whereby rotation of the brake motor will cause proper movement of said bell crank to release the brake shoes. In Figure 3, I have represented the brake motor connected through suitable gearing (not shown) to a jack shaft 115, the latter being provided with a suitable crank pin 116 to which is connected a link or pitman 117, said pitman being pivotally connected at its upper end to the extended arm of the bell crank 112. It is apparent from this construction that rotation of the brake motor imparts rotation to the jack shaft 115 and that this motion, through the crank and pitman connection insures a downward pull on the bell crank 112 to release the brakes. When the brake motor is deenergized, the spring 109 functions to apply the brake.

In operation, it will be seen that as the controller is advanced from "off" position to the first point hoist or lower, the resistances 62, 75 and 83 are connected in star and the brake motor rotor is thus energized through the slip rings of the main motor rotor. As above stated, the resistances 96, 99 and 102 permanently in circuit between the slip rings of the brake motor and the slip rings of the main motor cut down the developed torque of the brake motor to substantially one-fourth of its full load torque. This causes a partial release of the brake shoes and the main motor speeds up. As the main motor increases its speed, the main motor rotor voltage drops, with a corresponding drop in the developed torque of the brake motor. This causes an increase in the applied brake pressure tending to slow down the speed of the main motor. As the controller handle is advanced in either direction this action is repeated for each stage with the result that there is substantially a definite speed for each point on the controller, regardless of the load being handled. During the first four points lowering and the first two points hoisting, it will be remembered that the junction points between the resistances 62 and 63, 75 and 74, 83 and 82, are connected through the controller to form a star connection which prevents the main line voltage from entering the stator windings of the brake motor. Under these conditions the brake motor stator becomes the secondary element of the motor with the rotor serving as the primary element. When the controller handle is advanced beyond the fourth point lowering or the second point hoisting, the star connection at the junction point of the resistances just referred to is opened and the main line voltage is dilevered to the stator of the brake motor through said resistances in series. This high voltage in the brake motor stator causes a great increase in the developed torque of the brake motor which results in a complete release of the brakes. Under these conditions the rotor of the brake motor becomes a secondary element of the motor while the stator thereof becomes the primary energized directly from the main line. Also it is to be noted that as the rotor regulating resistances are gradually cut out of the circuit as the controller handle is advanced beyond the fourth point lowering and the second point hoisting the connection of the resistances 96, 99 and 102 with the slip rings of the brake motor gradually approaches what is substantially a star connection. Under these conditions, bearing in mind the gradual drop in the rotor voltage of the main motor due to the increased main rotor speed, little or no current will flow from the main motor rotor to the brake motor rotor, so that the brake motor is then operating substantially in response to main line voltage.

It may be here stated that the brake motor stator resistances 63, 74 and 82 do not necessarily cause a decreased torque effect in the brake motor for the reason that the brake motor is usually wound for a low voltage. If, however, a high voltage brake motor is used, these resistances may be omitted.

From the foregoing description it will be apparent that I have provided a control system for electric motors being capable of general application but designed particularly for hoist or elevator installations, in which a normally applied electro-mechanical brake is connected with the controller of the main motor in a manner such that the effective braking effort is rendered dependent upon the speed of the main motor. By the arrangement shown four definite speeds may be obtained on the lowering side of the hoist and two definite speeds on the hoist side, although it is apparent that if desired any additional number of such steps on either side of the controller may be provided by properly arranging the point at which the star connection of the brake motor stator resistances is opened. In this connection it is also to be noted that as the controller handle is advanced from off position through the initial stages of hoisting or lowering, the brake is applied with gradually increasing effect while the torque of the main motor is gradually increased due to the short circuiting of the controller resistances. This enables the main motor to drive the load either up or down against the increased braking effort and to provide definite speeds for particular controller positions without regard to the load being handled.

It is also evident that the brake motor is energized during the initial stages of either hoisting or lowering from the rotor of the main motor and, during the final stages of hoisting or lowering is energized directly from the main line supply without at any time deenergizing the brake motor. This arrangement insures a smooth and flexible operation of the brake at all times and prevents any undesirable momentary application of the brakes during transition of the controller from one position to the other.

It will of course be understood that the foregoing description and the accompanying drawings are but for the purpose of illustrating a preferred form of my invention and not to define the limits of my invention which may be determined from the scope of the appended claims.

What is claimed is:

1. In a motor control system, a main motor including relatively movable electromagnetic members, a brake for the main motor, a motor for operating the brake and including relatively movable electromagnetic members, said stationary and movable members of the brake motor being electrically connected in parallel with the respective stationary and movable members of the main motor, and means for controlling both motors.

2. In a motor control system, a main motor, a brake for the main motor, a motor for operating the brake, a source of electric potential and a controller, the stators of the main motor and the brake motor being connected in parallel with the source of potential, and the rotors of the main motor and the brake motor being connected in parallel with the controller, and means for selectively energizing the brake motor from the source of potential, or from the rotor of the main motor.

3. In a motor control system, a main motor, a brake for the main motor, a motor for operating the brake, a source of electrical potential and a controller, the stators of the main motor and the brake motor being connected in parallel with the source of potential, and the rotors of the main motor and the brake motor being connected in parallel with the controller, and means for selectively reversing the primary and secondary elements of the brake motor.

4. In a motor control system, a main motor, a controller operatively associated therewith, a brake for the main motor, and a motor for operating the brake, said brake motor having its rotor electrically connected to the rotor of the main motor, and energized therefrom.

5. In a motor control system, a main motor, a controller operatively associated therewith, a brake for the main motor, and a motor for operating the brake, said brake motor having its rotor electrically connected to the rotor of the main motor, and its stator electrically connected to the stator of the main motor, and means operable in certain "on" positions of the controller for preventing energization of the brake motor stator when the main motor is energized.

6. In a motor control system, a main motor, a controller operatively associated therewith, a brake for the main motor, and a motor for operating the brake, said brake motor having its rotor electrically connected to the rotor of the main motor, and its stator electrically connected to the stator of the main motor, and means for energizing the brake motor from the main motor rotor to the exclusion of the main motor stator in certain "on" positions of the controller.

7. In a motor control system a suitable source of electric potential, a main motor, a controller operatively associated therewith, a brake for the main motor, and a motor for operating the brake, said brake motor having its rotor electrically connected to the rotor of the main motor, and its stator electrically connected to the stator of the main motor, and means for selectively energizing the brake motor directly from said source of potential or from said source through the rotor of the main motor.

8. In a motor control system, a main motor, a controller therefor, a brake for the main motor, a motor for operating the brake, said brake motor having its stator electrically connected with the stator of the main motor, said connection including a series resistance, and means for selectively short circuiting said resistance so connected and arranged to prevent energization of the brake motor stator when the main motor stator is energized.

9. In a motor control system, a main 3 phase A. C. motor, a brake therefor, a 3 phase A. C. motor for operating the brake, the stator of the main motor and the stator of the brake motor being electrically connected through series resistances, and means for selectively connecting said resistances in "star" to prevent energization of the brake motor stator when the main motor stator is energized.

10. In a motor control system, a main motor, means for controlling said motor including a brake, a controller for causing the main motor to run in either direction, a motor for operating the brake, the brake motor having its rotor and stator respectively electrically connected with the rotor and stator of the main motor, the electrical connections between said stators including series resistances and means for short circuiting said resistances on low speed positions of the controller for either direction of rotation of the motor.

11. In a motor control system a main motor, a controller therefor, a brake for the main motor, a motor for operating the brake, said brake motor having its rotor electrically connected with the rotor of the main motor, and a regulating resistance connected to the controller and in series with the connected rotors.

12. In a motor control system, a main motor, a brake therefor, a second motor arranged to operate the brake, each of said motors including a relatively stationary electro-magnetic member and a relatively movable electro-magnetic member, series resistors electrically connecting the respective stationary and movable members of the main motor and said second motor, and control means operatively associated with said motors and including means for selectively short-circuiting the resistors of either group for causing either the rotor or the stator of said brake operating motor to act as the primary element of said motor when said motors are energized.

13. In a motor control system, a main motor, a brake therefor, a second motor arranged to operate the brake, each of said motors including a stator and a rotor, series resistors connecting the respective stators and rotors of said motors and control means operatively associated with said motors and including means for selectively short-circuiting the resistors of either group for causing either the rotor or the stator of said brake operating motor to act as the secondary element of said motor.

14. In a motor control system, a main motor, control means therefor, including a normally applied brake, a motor for releasing the brake and means for energizing the brake motor from the rotor of the main motor, said means including a resistance connected in series between the main motor rotor and the brake motor rotor for reducing the voltage applied to the brake motor below that of the main motor rotor at standstill.

15. The method of controlling a plurality of electric motors having means for electrically connecting the respective rotors and stators of the motors through suitable resistances, comprising, energizing one of the motors from a suitable source of electric potential, and simultaneously short circuiting the stator of the second motor whereby to energize said second motor through its rotor from the rotor of the first motor and subsequently removing the short circuit from the stator of the second motor whereby to supply thereto a controlling potential.

16. The method of controlling a plurality of multi-phase A. C. motors having means for electrically connecting the respective rotors of said motors, and electrically connecting the stators of said motors through series resistances comprising energizing the stator of one of said motors and simultaneously connecting the series resistances in "star" whereby to energize the second motor from the rotor of the first motor.

17. The method of controlling a plurality of multi-phase A. C. motors having means for electrically connecting the respective rotors of said motors, and electrically connecting the stators of said motors through series resistances comprising energizing the stator of one of said motors and simultaneously connecting the series resistances in "star" whereby to energize the second motor from the rotor of the first motor, and subsequently breaking the star connection of the resistances and applying a controlling potential to the stator of the second motor.

18. The method of controlling an electric motor provided with a normally-applied motor-released brake, which comprises short circuiting the stator of the brake motor and energizing said motor through its rotor from the rotor of the main motor during low speed operation of the main motor, and removing the short circuiting connection from the brake motor stator and applying thereto a controlling potential during high speed operation of the main motor.

19. The method of controlling an electric motor provided with a normally-applied motor-released brake which comprises short circuiting the stator of the brake motor and supplying from a suitable source of potential a low potential to the rotor of the brake motor through the rotor of the main motor during low speed operation of the main motor, and removing the short circuit from the brake motor stator and supplying thereto a higher voltage direct from the source of potential during high speed operation of the main motor.

20. The method of controlling an electric motor provided with a normally-applied motor-released brake and means for electrically connecting the respective rotor and stator members of said motors comprising energizing the main motor from a suitable source of electric potential, and short-circuiting the stator of the brake motor whereby to energize the brake motor through its rotor from the rotor of the main motor during low speed operation of the main motor, and subsequently removing the short-circuit from the brake motor stator and short-circuiting the brake motor rotor whereby to apply a controlling potential to the brake motor direct from the source of potential during high speed operation of the main motor.

In witness whereof, I hereto affix my signature.

GEORGE J. LEXA.